United States Patent [19]
Vogelsberger

[11] Patent Number: 5,521,485
[45] Date of Patent: May 28, 1996

[54] REGULATOR CIRCUIT WITH PROGRESSIVE EXCITATION FOR CHARGING A BATTERY BY MEANS OF AN ALTERNATOR

[75] Inventor: Marcel Vogelsberger, Wissous, France

[73] Assignee: Valeo Equipements Electriques Moteur, Creteil, France

[21] Appl. No.: 196,297

[22] Filed: Feb. 10, 1994

[30] Foreign Application Priority Data

Feb. 12, 1993 [FR] France ................................. 93 01592

[51] Int. Cl.$^6$ ..................................... H02J 7/24
[52] U.S. Cl. ................................. 322/28; 322/18
[58] Field of Search ............................ 322/28, 29

[56] References Cited

U.S. PATENT DOCUMENTS

| | | | |
|---|---|---|---|
| 4,346,337 | 8/1982 | Watrous | 322/25 |
| 4,634,954 | 1/1987 | Kato et al. | |
| 5,157,321 | 10/1992 | Kato et al. | 322/28 |
| 5,225,764 | 7/1993 | Falater | 322/28 |
| 5,319,299 | 6/1994 | Maehara | 322/28 |
| 5,376,876 | 12/1994 | Bauser et al. | 322/28 |

FOREIGN PATENT DOCUMENTS

| | | |
|---|---|---|
| 0214781 | 3/1987 | European Pat. Off. . |
| 0421332 | 4/1991 | European Pat. Off. . |
| 4113732 | 11/1991 | Germany . |

*Primary Examiner*—Thomas M. Dougherty
*Assistant Examiner*—Nicholas Ponomarenko
*Attorney, Agent, or Firm*—McCormick, Paulding & Huber

[57] ABSTRACT

A circuit for regulating the voltage at which a battery is charged by an alternator compares a reference with first data derived from the alternator voltage to generate a first excitation control signal. The circuit further comprises:

means for storing second variable data;

means comparing a reference with said second data to generate a second excitation control signal;

control means for the second data an acting on the first and second control signals to cause said second data to vary in correspondence with variations in the first data, but at a slower rate, whenever there is a sudden increase in current demand on the alternator; and selector means active under such circumstances to cause excitation to be controlled by means of said second control signal, thereby ensuring that excitation of the alternator is increased progressively.

11 Claims, 3 Drawing Sheets

FIG_1

REGULATOR CIRCUIT WITH PROGRESSIVE EXCITATION FOR CHARGING A BATTERY BY MEANS OF AN ALTERNATOR

The present invention relates to a circuit for regulating the voltage at which a battery is charged by an alternator in a motor vehicle, or the like.

BACKGROUND OF THE INVENTION

Conventionally, such a circuit comprises means for comparing a reference signal with a first variable signal which is derived from the output voltage of the alternator, and for generating a first control signal having an electrical characteristic that varies as a function of the result of the comparison to cause the excitation of the alternator to vary.

Under such circumstances, when the vehicle engine is idling and the alternator is subjected to high current demand, as occurs particularly when switching on electrical equipment such as devices that use the Joule effect for de-icing or for heating, air conditioners, headlights, etc. . . , the voltage at the output from the alternator is caused to drop suddenly, thereby causing maximum excitation current to be applied thereto immediately. The torque load of the alternator on the engine therefore increases suddenly and that can cause the engine to hiccup or even to stall.

It is already known that the above drawback can be mitigated by ensuring that when the electrical load on the alternator increases suddenly, excitation of the alternator increases only progressively, in particular so as to allow time for an electronic engine control circuit to respond to the situation. Nevertheless, that kind of known circuit can be relatively complex and expensive to implement.

In addition, known circuits are generally active below a certain threshold number of engine revolutions per minute (rpm), and inactive above that threshold, and this often results in the regulator circuit behaving in a way that is poorly suited to the real revolution speed of the engine. In particular, progressive excitation of the alternator may take place even when that is unnecessary, thus giving rise to a period of time that is clearly perceptible to the driver during which the voltage of the electrical circuit of the vehicle is excessively low.

OBJECTS AND SUMMARY OF THE INVENTION

The present invention seeks to mitigate those drawbacks of the prior art and to provide a regulator circuit providing the above-specified function but that is easy and cheap to implement, highly reliable, consumes little electrical power, and additionally adapts its operation relatively closely to the real revolution speed of the engine.

To this end, the invention provides a circuit for regulating the voltage at which an alternator charges a battery, in particular for a motor vehicle, the circuit being of the type comprising means for comparing a reference signal with a first variable signal which is derived from the output voltage of the alternator and for generating a first control signal having an electrical characteristic that varies as a function of the result of the comparison to cause excitation of the alternator to vary, the circuit further comprising:

means for storing a second variable signal;

means for comparing a reference signal with said second variable signal, and for generating a second control signal having an electrical characteristic that varies as a function of the result of the comparison to vary the excitation of the alternator;

means for controlling said second variable signal, said controlling means acting on the first and second control signals to cause said second variable signal to vary in correspondence with variations in the first variable signal, but at a rate that is slower than the rate at which said variations take place in the first variable signal in the event of a sudden increase in current being demanded from the alternator and the battery; and means for selecting between control of the alternator's excitation based on the first control signal and control of the alternator's excitation based on the second control signal, said means utilizing said second control signal in the event of such a sudden increase in the current demanded from the alternator and the battery, thereby causing excitation of the alternator to increase progressively.

Most advantageously, the rate at which the second variable signal data varies is determined as a function of the rotation speed of the alternator.

BRIEF DESCRIPTION OF THE DRAWINGS

Other aspects, objects, and advantages of the present invention appear more clearly on reading the following detailed description of a preferred embodiment of the invention, given by way of example and made with reference to the accompanying drawings, in which.

MORE DETAILED DESCRIPTION

Figure 1:
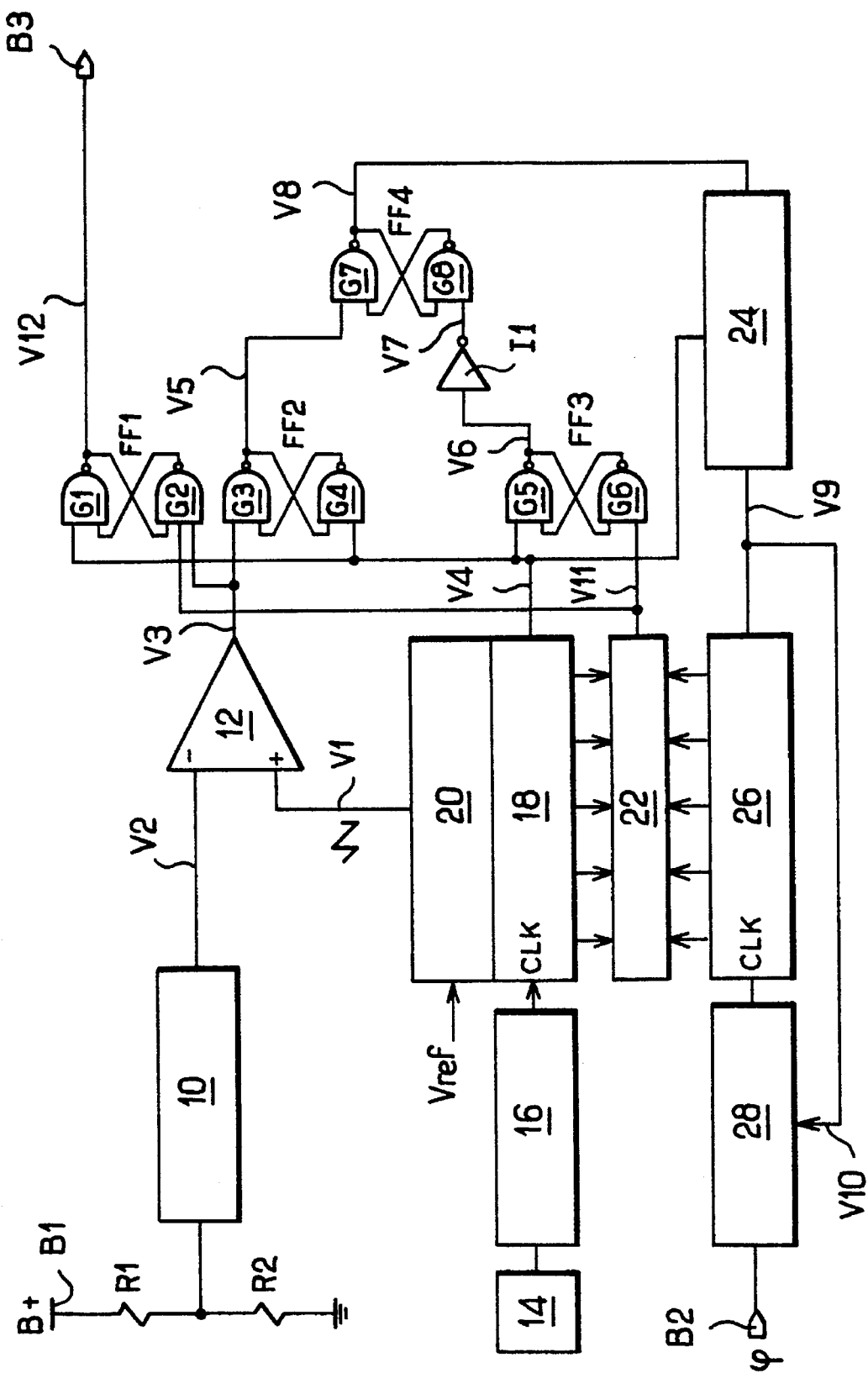
FIG. 1 is a block diagram of an electronic circuit of the invention for causing loading to increase progressively.

With reference initially to FIG. 1, there can be seen a circuit comprising an input terminal B1 for the voltage B+ at the positive terminal of the vehicle battery, a terminal B2 for a phase signal φ delivered by the alternator of the vehicle, and an output terminal B3 for controlling a semiconductor switch (not shown) that in turn controls the excitation current in the excitation winding of the alternator.

The voltage B+ is applied to a resistive divider bridge R1, R2, with a fraction of B+ being taken from the midpoint of said bridge and being applied to the input of a lowpass filter 10 serving to eliminate AC and pulse components therefrom, e.g. high frequency interference.

The output from the filter 10 (voltage V2) is a first variable signal which is applied to the negative input of an analog comparator 12.

A fixed frequency oscillator or clock circuit 14 feeds the clocking input CLK of a digital down counter 18 via a pre-divider circuit 16, the down counter being a 5-bit counter, for example.

The five parallel outputs of the counter 18 are applied to five parallel inputs of a digital-to-analog converter 20 which conventionally receives a reference voltage Vref that is preferably generated by the circuit itself. As a result, the circuit 20 produces a sawtooth signal of successive falling ramp voltages (voltage V1) at its output and as a function of successive down counts by the circuit 18, which ramps are applied to the positive input of the comparator 12. The comparator 12 produces a first control signal, constituted by the voltage V3, which is representative of the result of the comparison of the sawtooth signal with the first variable signal. The count down circuit 18 also delivers a clock signal (voltage V4) at the same frequency as the down ramps and described in detail below.

The five parallel outputs from the counter 18 are also applied to a first series of inputs of a 5-bit digital comparator 22.

The circuit of the invention also includes four bistable flip-flops FF1, FF2, FF3, and FF4 each constituted in entirely conventional manner by an appropriate cross-connection of a pair of NAND gates given respective references G1 to G8.

The bistable FF1 receives the clock signal V4 as produced by the counter 18 via its gate G1. Via its gate G2, which is a three-input gate, it receives two input signals respectively constituted by the voltage V3 at the output from the comparator 12 and by the voltage V11 at the output from the digital comparator 22.

The output of FF1 (voltage V12 taken from gate G1) constitutes the excitation control signal and is connected to the output terminal B3.

The second bistable FF2 receives the output signal V3 from the analog comparator 12 via gate G3, and it receives the above-mentioned clock signal V4 via gate G4.

The output from FF2 (voltage V5 taken from gate G3) is applied to the input of bistable FF4 situated on its gate G7. The input of bistable FF3 situated on its gate G5 receives the clock signal V4, whereas its input on gate G6 receives the output V11 from the digital comparator 22. The output of bistable FF3 (voltage V6 taken from gate G5) is applied to the input of a logical inverter I1 whose output (voltage V7) is connected to the second input of bistable FF4 via its gate G8.

The output of FF4 (voltage V8 taken from gate G7) is connected to the input of a noise integrator circuit 24 constituted, for example, by an N-cell shift register (e.g. having eight cells), whose cells are connected to a combinational circuit (not described in detail) whose behavior is described below. The output from the circuit 24 is a three-state output and it provides a signal referenced V9.

This voltage V9 is applied to the UP/DOWN count direction input of another digital counter 26 of the UP/DOWN type, which produces the second variable signal having five parallel outputs that are connected to the other five inputs of the above-mentioned digital comparator 22. The digital comparator 22 produces a second control signal, constituted by the voltage V11, which is representative of the result of the comparison of the output signal of the counter 18 with the second variable signal.

The clock input CLK of the up/down counter 26 is clocked by the signal $\phi$ after suitable shaping by appropriate means (not shown) via a predivider 28. The output voltage V9 from the noise integrator circuit 24 is also applied to the predivider 28 (voltage referenced V10 in the figures) for the purpose of selectively enabling or disabling operation thereof, and also to vary its division ratio in a manner described below.

The operation of the FIG. 1 circuit is now described with reference initially to FIG. 2 and then to FIG. 3.

As a preliminary point, it is mentioned that the regulation performed by the present invention is of the fixed-frequency type, that is to say that alternator excitation is varied solely by modifying the duty ratio of a rectangular signal whose frequency is unchanging.

Figure 2:
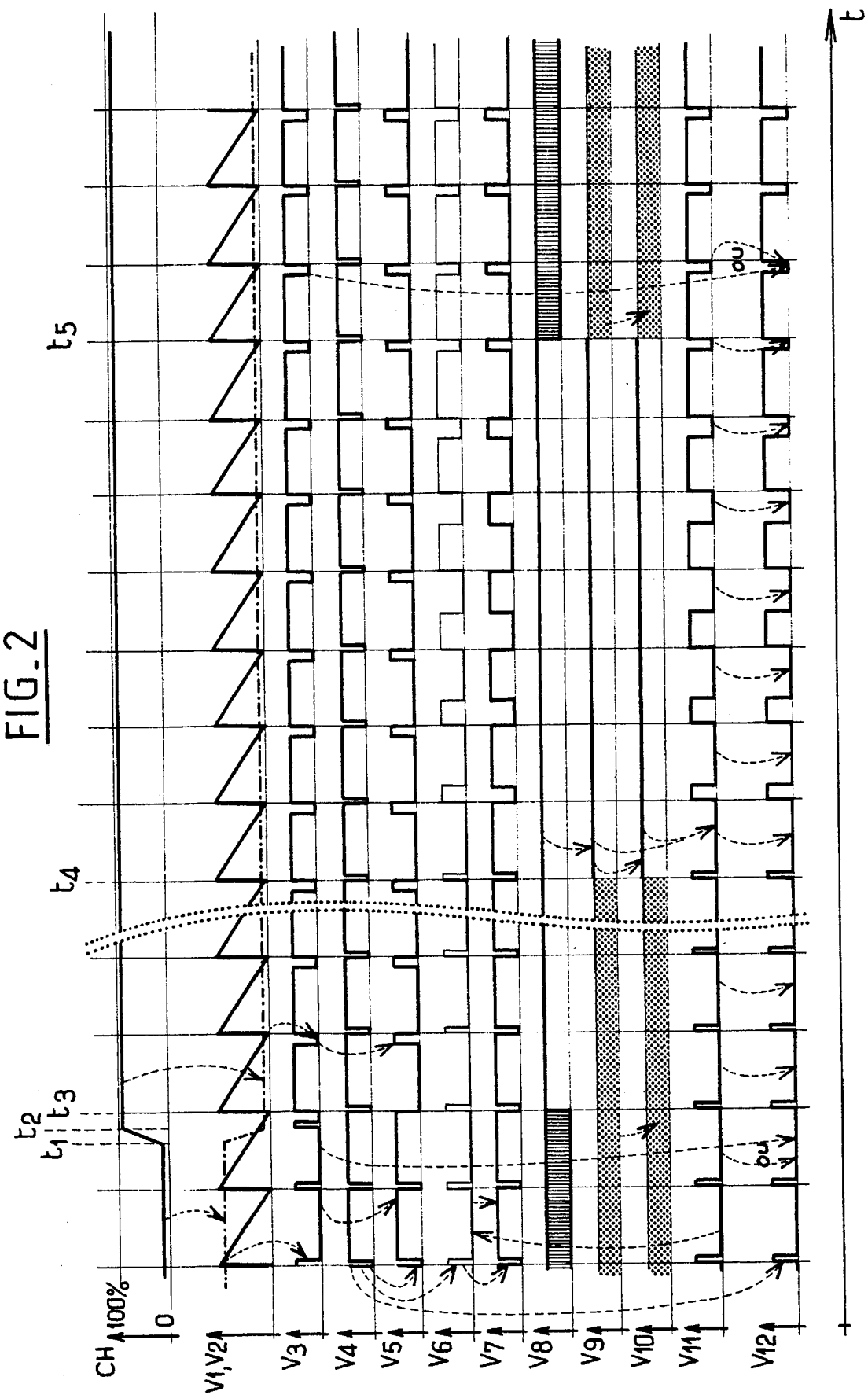
FIGS. 2 and 3 are two waveform diagrams showing the behavior of the FIG. 1 circuit in two different situations.

Assume initially that the alternator associated with the circuit of the present invention is operating under stable conditions and at low load, with the signal CH representative of said load and expressed in percent being shown in FIG. 2.

In this situation, the fraction of the voltage B+ after filtering (voltage V2 represented by chain-dotted lines) is at a high level. This voltage value is compared with the downwardly sloping ramps (voltage V1, drawn in solid lines) coming from the converter 20 to cause the voltage V3 to be generated, which voltage is in the form of a rectangular signal whose duty ratio, written RC1%, is low.

It may be observed at this point that the down counter 18 delivers the clock signal V4 in the form of short logic "0" pulses at the beginning of each ramp in the signal V1, and thus at the frequency at which regulation takes place.

In the low load situation mentioned above, the output voltage V12 of the circuit needs to have the same logic levels at the same instants as the voltage V3. To this end, the bistable FF1 is set to a high or "1" level by each falling edge in the clock signal V4, and it is reset to the low or "0" level by each falling edge in the voltage V3. The bistable FF1 therefore delivers the signal V12 as shown which is identical to the signal V3, and excitation of the alternator is therefore controlled using the same duty ratio as the signal V3 for the purpose of regulating the output voltage of said alternator in conventional manner. It may be observed at this point that the use of the bistable FF1 between the output of the comparator 12 and the main output of the FIG. 1 circuit makes it possible to ensure good immunity to the noise and interference that are normally to be found in the environment of an alternator.

It is assumed here that the contents of the up/down counter 26 is such that the comparison performed at 22 between said contents and the contents of the down counter 18 gives rise to a signal V11 whose duty ratio is very close to the duty ratio RC1% of the signal V3. Under such conditions, the falling edges of the signals V3 and V11 occur at substantially the same instants, and the bistable FF1 which receives these two signals does indeed behave as described above.

The purpose of the bistable FF2 is to produce a voltage V5 at its output that is representative of the duty ratio "demanded" for regulation purposes. In the above-mentioned stable situation of low load, the bistable FF2 is reset to level "0" by the falling edges in the clock signal V4, unlike the bistable FF1. The bistable FF2 is set to level "1" by the falling edges in the signal V3 at the output from the comparator 12. Thus, the bistable FF2 delivers a signal V5 that is the inverse of the signal V3, that retains the same duty ratio, and that serves, in this case also, to provide noise immunity.

The bistable FF3 responds only to the clock signal V4 and to the output signal V11 from the digital comparator 22. Falling edges in V4 set the output V6 of the bistable FF3 to level "1", while falling edges in the voltage V11 reset said voltage V6 to level "0". Thus, in this stable situation, the bistable FF3 delivers a signal V6 which reproduces the signal V11, with the same duty ratio, related to the contents of the counter 26. This signal V6 is inverted by the inverter I1 to produce the signal V7.

It may be observed here that, for the reasons mentioned above, the falling edges in V5 and V7 are superposed to within a propagation delay time that is negligible, whereas their rising edges are superposed only approximately.

The purpose of the bistable FF4 is to compare the durations of low level periods (and thus the duty ratios) in the voltages V5 and V7, and to deliver a signal (voltage V8)

whose level is "0" or "1", as a function of said comparison. So long as the above-mentioned stable conditions continue, the bistable FF4 delivers alternating "0" and "1" levels that are loaded successively into the shift register of the circuit 24.

So long as said shift register contains both "0" and "1" levels, its output remains in an inactive state (e.g. a high impedance state), so the contents of the counter 26 do not change.

Under such conditions, it will be therefore be understood that regulation takes place normally. At this point it may be observed that since the contents of the counter 26 are "frozen" during this situation of "normal" operation, unnecessary activity is avoided in the circuit that is provided for performing fine adjustment of the contents of said counter on a permanent basis.

FIG. 2 shows a sudden increase in the electrical load on the alternator between instants t1 and t2, associated with the switching on of one or more electrical equipments in the vehicle that take a large amount of current.

The voltage V2 obtained from B+ therefore falls quickly at the same instants. Starting from the immediately following cycle (instant t3), the duty ratio of V3 switches to a high value written RC2%, whereas the duty ratio of V11 remains unchanged for the time being. The falling edges in V11 now occur long before the falling edges in V3. The bistable FF1 whose gate G2 receives both the signals V3 and V11 thus acts as a selector of the signal having the smaller duty ratio, and it is therefore the signal V11 that is reproduced at its output (voltage V12). This output V12 is thus maintained at a small duty ratio close to RC1% as determined by the contents of the counter 26. For the time being, there is therefore no increase in the excitation of the alternator.

In contrast, this situation will give rise to the following phenomenon at the inputs of the bistable FF4 whereby the rising edges in V5 appear right at the end of the cycle, long after the rising edges in V7 that remain unchanged for the time being. As a result, the voltage V8 remains permanently at logic level "1", and the shift register is filled progressively with logic "1" levels. At the end of a number of cycles N equal to the number of cells in the shift register, the register is completely filled with logic "1" levels (instant t4). The logic of the circuit 24 is designed (using a conventional AND function) to take its output V9 at said instant to logic level "1", thereby causing the contents of the counter 26 to be decremented at a rate determined by the output from the predivider 28.

As shown, this progressive reduction in the contents of the counter 26 gives rise to a progressive increase in the duty ratio of the signal V11.

Given that it is now the falling edges in the signal V11 that are earlier than the falling edges in the signal V3 that now act on the bistable FF1 to switch its output level to "0", the output signal V12 of the circuit adopts the same progressively-increasing duty ratio as the signal V11. Excitation of the alternator is thus increased progressively. It may be observed at this point that the rate of increase in the excitation depends on the rate at which the contents of the counter 26 decrease, which rate is in turn proportional to the speed of rotation of the alternator. The clock input of the counter 26 receives a signal whose frequency is proportional to the speed of rotation of the alternator (angular frequency of the phase signal applied on input B2). The division ratio applied by the predivider 28 is given an appropriate value when it receives logic level "1" from the circuit 24 corresponding to counting down.

This characteristic of the present invention is advantageous in that progressive loading of the alternator takes place more quickly the faster the present speed of rotation of the alternator, i.e. the greater the speed of rotation of the associated engine, the faster the loading of the alternator. In other words, the smaller the risk of the engine hiccuping or stalling, the greater the rate at which the alternator is loaded.

Once the contents of the counter 26 have fallen to a value such that the duty ratios of the voltages V3 and V11 are again similar (instant t5), the bistable FF4 is again in the same situation with respect to the time organization of rising edges as it was under the stable low-load conditions described above: it delivers alternating output levels "0" and "1", which are then loaded into the shift register of the circuit 24. The logic of this circuit then delivers an inactive output state, thereby causing decrementation by the counter 26 to halt, and thus "freezing" the contents thereof. The duty ratio of the signal V11 therefore remains constant and close to that of the signal V3. From this instant, the output V12 of the circuit has a duty ratio that is substantially equal to the demanded duty ratio as defined by the signals V3 and V5.

It will be understood from the above description that a certain amount of time must elapse between the moment when a high duty ratio is demanded (instant t2) and the moment when the duty ratio applied to the excitation control (voltage V12) actually begins to increase. This waiting or delay period (until all of the cells in the shift register contain the same logic value) is advantageous in that no account is taken of any sudden increases in load that are of very short duration (no more than a few cycles).

Figure 3:
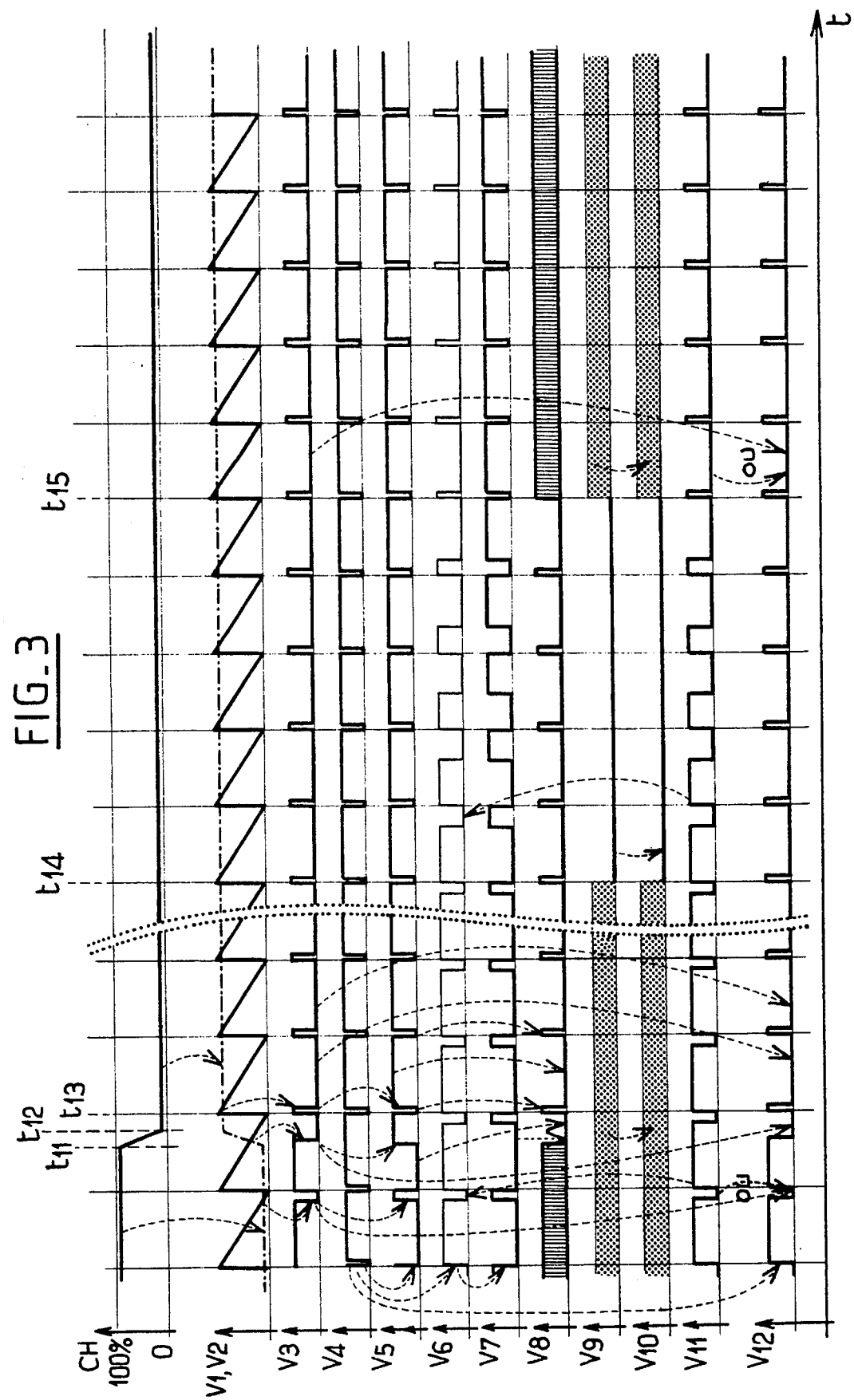

FIG. 3 is similar to FIG. 2 and shows the transition from a stable high load level to a low load level.

When the electrical load connected to the alternator drops suddenly (FIG. 3), the circuit of FIG. 1 behaves in some aspects in a manner that is the inverse of that described with reference to FIG. 2. Prior to the sudden drop in load (beginning at instant t11), the contents of the counter 26 are stable at a value such that the duty ratios of the signals V3 and V11 are close to each other. The bistable FF4 delivers a mixture of "0" and "1" logic signals, and the output of the circuit 24 is in its inactive state.

When the load drops suddenly between t11 and t12, the duty ratio of signal V3 becomes much lower than that of signal V11 as from the beginning of the following regulation cycle (instant t13). Given that the role of the bistable FF1 is to select the lower duty ratio one of the two signals V3 and V11 that it receives, it is thus the signal V3 that is reproduced in the output signal V12, and excitation of the alternator is immediately reduced.

It may be observed that in the event of a drop in electrical load (caused by switching off an appliance that draws a high current), there is no danger in immediately reducing alternator excitation since the only effect on the engine is a brief increase in its revolution speed, and that is not harmful.

Simultaneously, the bistable FF4 delivers a voltage V8 which takes the level "0" each time the shift register is loaded.

As soon as the shift register has been fully loaded with "0" levels, the logic of the circuit 24 responds to this situation by delivering an output voltage V9 at logic level "0" (instant t14). This logic level causes the contents of counter 26 to be incremented at a rate fixed by the angular frequency of the phase signal from the alternator, and by the division ratio of the predivider 28. It may be observed that, on the assumptions applicable to FIG. 2, this division ratio is preferably smaller than that implemented when a logic level "1" is present in V9. This ensures that the contents of the counter 26 increase as quickly as possible, given that said contents have no effect on the duty ratio of the output signal V12.

The advantage of such a rapid increase in the contents of the counter 26 is to bring the circuit as quickly as possible back to the initial state that corresponds to the beginning of the timing chart of FIG. 2. In other words, the circuit is readied as quickly as possible to cope with a new sudden increase in electricity consumption.

At the end of this rapid increase (instant t15) the circuit is back in its initial state. It may be observed that time intervals t4–t5 in FIG. 2 and t14–t15 in FIG. 3 are shown as being similar for the purposes of simplification, whereas, given the above explanation, the time required in practice to pass from the state of instant t14 to the state of instant t15 comprises a much smaller number of cycles than that required to pass from the state of instant t4 to that of instant t5.

In a variant, provision may be made for the signal V9, on passing to level "0", to cause the predivider 28 to be bypassed so that the suitably shaped phase signal is thus applied directly to the clock input of the counter 26.

It may be observed that the circuit of FIG. 1 behaves as described regardless of the amplitude of changes in the load on the alternator. It is just that if there is a small change in load, then the amplitude of the change to be given to the contents of counter 26 is smaller so the new stable value is reached quickly. The regulation time constant remains perfectly acceptable.

Naturally, the present invention is not limited to the embodiment described above and shown in the drawings, and the person skilled in the art will be able to make any variation or modification coming within the ambit of the invention.

I claim:

1. A circuit for regulating the voltage at which an alternator charges a battery, in particular for a motor vehicle, the circuit being of the type comprising:

means for comparing a reference signal with a first variable signal derived from the output voltage of the alternator, and for generating a first control signal having an electrical characteristic that varies as a function of the result of the comparison of the reference signal with the first variable signal to vary the excitation of the alternator;

means for generating a second variable signal;

means for comparing a reference signal with said second variable signal, and for generating a second control signal having an electrical characteristic that varies as a function of the result of the comparison of the reference signal with the second variable signal to vary the excitation of the alternator;

means for controlling the second variable signal, said means utilizing the first and second control signals to cause said second variable signal to vary in correspondence with variations in the first variable signal, but at a rate that is slower than the rate at which said variations take place in the first variable signal in the event of a sudden increase in current being demanded from the alternator and the battery, and causing said second variable signal to vary only after a certain time period has elapsed after an increase in the current demand on the alternator and the battery, said means for controlling the second variable signal comprising a logic circuit which compares the duty ratios of the first and second control signals, and an integrator circuit suitable for causing said second variable signal to vary only after said logic circuit has given the same output signal for a given number of regulation cycles; and means for selecting between control of the alternator's excitation based on the first control signal and control of the alternator's excitation based on the second control signal, said means utilizing said second control signal to control the alternator's excitation in the event of a sudden increase in the current demanded from the alternator and the battery, thereby causing excitation of the alternator to increase progressively.

2. A circuit according to claim 1, wherein the first variable signal is a voltage proportional to said output voltage of the alternator, in that the second variable signal varies over the same range and in the same direction as the first variable signal, in that said means for comparing a reference signal with the first variable signal and said means for comparing a reference signal with the second variable signal compare the first and second variable signals, respectively, with the reference signals constituted by a sawtooth signal and a counter output signal, respectively, and in that the first and second control signals are signals of variable duty ratio.

3. A circuit according to claim 2, wherein the sawtooth reference signal is obtained by digital-to-analog conversion of the signal produced by a first digital counter controlled by a clock, in that said second variable signal is produced by a second digital counter, and in that the means for comparing a reference signal with the second variable signal is a digital comparator comparing the signals produced by said first and second counters.

4. A circuit according to claim 1, wherein the logic circuit of the means for controlling the second variable signal comprises a bistable flip-flop and in that; the integrator circuit of the means for controlling the second variable signal comprises a shift register associated with a combinatorial logic circuit.

5. A circuit according to claim 1, wherein the rate at which the second variable signal varies is determined as a function of the rotation speed of the alternator.

6. A circuit according to claim 5, wherein the rate at which the second variable signal varies in a direction corresponding to a reduction in the output voltage from the alternator is slower than the rate at which said second variable signal varies in the opposite direction.

7. A circuit according to claim 3, wherein the rate at which the second variable signal varies is determined as a function of the rotation speed of the alternator, wherein the rate at which the second variable signal varies in a direction corresponding to a reduction in the output voltage from the alternator is slower than the rate at which said second variable signal varies in the opposite direction, and wherein a clock input of a second digital counter receives a clock signal derived from a phase signal of the alternator.

8. A circuit according to claim 7, wherein a digital divider circuit is provided having a control input for varying its division ratio as a function of the output signal from the means for controlling the second variable signal.

9. A circuit according to claim 8, wherein the division ratio is unity when said second variable signal is varying in said opposite direction.

10. A circuit according to claim 3, wherein the means for selecting between control of the alternator's excitation based on the first control signal and control of the alternator's excitation based on the second control signal provides an output signal constituted by that one of the first and second control signals that has the smaller duty ratio.

11. A circuit according to claim 10, wherein said means for selecting between control of the alternator's excitation based on the first control signal and control of the alternator's excitation based on the second control signal comprises a bistable flip-flop whose two reset inputs receive the output signals from the means for comparing a reference signal with the first variable signal and the means for comparing a reference signal with the second variable signal.

* * * * *